(12) United States Patent
Godbole et al.

(10) Patent No.: US 6,839,979 B1
(45) Date of Patent: Jan. 11, 2005

(54) TOP MOUNTED TURBINE CASING ALIGNMENT TOOL WITH MULTI-AXIS MANEUVERABILITY

(75) Inventors: Vinayak Shashikant Godbole, Simpsonville, SC (US); David Leach, Simpsonville, SC (US); Stuart Forrest Waldo, Salem, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/646,731

(22) Filed: Aug. 25, 2003

(51) Int. Cl.$^7$ .............................................. G01B 5/252
(52) U.S. Cl. ..................... 33/645; 33/613; 33/DIG. 8
(58) Field of Search .................... 33/645, 613, 568, 33/412, DIG. 8; 269/309

(56) References Cited

U.S. PATENT DOCUMENTS

| | | | | |
|---|---|---|---|---|
| 2,132,407 A | * | 10/1938 | Fowler | 33/572 |
| 2,164,825 A | * | 7/1939 | Lack | 33/672 |
| 2,356,923 A | * | 8/1944 | Firestone | 33/194 |
| 2,568,952 A | * | 9/1951 | Dailey | 269/98 |
| 3,088,307 A | * | 5/1963 | Gray | 73/1.01 |
| 3,175,820 A | * | 3/1965 | Schiler | 269/296 |
| 4,112,582 A | * | 9/1978 | Beckershoff | 33/655 |
| 4,161,068 A | * | 7/1979 | McMaster | 33/412 |
| 4,190,961 A | * | 3/1980 | James et al. | 33/644 |
| 4,415,304 A | * | 11/1983 | Tripoli et al. | 414/589 |
| 4,548,546 A | * | 10/1985 | Lardellier | 415/133 |
| 5,293,695 A | * | 3/1994 | Olshefsky | 33/783 |
| 5,479,722 A | * | 1/1996 | Smith et al. | 33/617 |
| 5,627,761 A | * | 5/1997 | Pollard | 700/279 |
| 5,727,327 A | * | 3/1998 | Wakabayashi et al. | 33/520 |
| 6,224,332 B1 | | 5/2001 | Leach et al. | |
| 6,237,242 B1 | * | 5/2001 | Woytassek et al. | 33/645 |
| 6,457,936 B1 | | 10/2002 | Leach et al. | |
| 6,698,741 B1 | * | 3/2004 | Dunn | 269/309 |

* cited by examiner

Primary Examiner—Diego Gutierrez
Assistant Examiner—R. Alexander Smith
(74) Attorney, Agent, or Firm—Nixon & Vanderhye P.C.

(57) ABSTRACT

A turbine casing alignment tool includes a first section securable to an outer shell of a turbine casing. A second section of the alignment tool is securable to an inner shell of the turbine casing. The alignment tool facilitates adjustment of at least one of the inner shell and the outer shell relative to the other in multiple degrees of freedom to control both co-linearity and concentricity of the outer shell and the inner shell.

10 Claims, 3 Drawing Sheets

TOP MOUNTED TURBINE CASING ALIGNMENT TOOL WITH MULTI-AXIS MANEUVERABILITY

BACKGROUND OF THE INVENTION

The present invention relates to turbine casing alignment and, more particularly, to an alignment tool and method that refines and simplifies turbine shell alignment and achieves additional degrees of freedom control in alignment.

The annular gap between a turbine case and rotating blade airfoil tip in a turbine is called 'clearance.' Leakage of pressurized gases through this gap reduces efficiency. On the other hand, if the rotor contacts the stator, the result could be catastrophic. It is important to have positive and minimal clearance for enhanced efficiency. Uniform clearance about the circumference of the rotor is needed in order to effectively minimize the clearance. If the rotor and casing are eccentric, the clearance varies along the circumference and is difficult to control. See FIG. 1. In addition to making the casing and rotor concentric, they should also be aligned such that their axes are co-linear. See FIG. 2. It would thus be desirable to devise a tool and simplified method that will achieve this function.

Existing designs for this purpose typically lack multiple degrees of freedom to control both co-linearity and concentricity. As a consequence, 'out-of-plane' misalignment may occur resulting in the elliptical clearance shown in FIG. 2.

BRIEF DESCRIPTION OF THE INVENTION

In an exemplary embodiment of the invention, a turbine casing alignment tool is provided with a first section securable to an outer shell of a turbine casing, and a second section securable to an inner shell of the turbine casing. The alignment tool facilitates adjustment of at least one of the inner shell and the outer shell relative to the other in multiple degrees of freedom to control both co-linearity and concentricity of the outer shell and the inner shell.

In another exemplary embodiment of the invention, a turbine casing alignment tool is provided for aligning an inner shell and an outer shell of a turbine casing, where the turbine casing includes a top half and a bottom half connected via at least a pair of connecting bolts. The alignment tool includes a substantially flat plate extendible across both the inner shell and the outer shell of the turbine casing. A pair of openings are formed through the flat plate sized and positioned to receive the connecting bolts on the outer shell. A plurality of apertures are formed through the flat plate sized and positioned to receive threaded bolts therein and into existing openings in the inner shell. A pair of planar adjusting mechanisms are respectively engageable with the connecting bolts via the pair of openings.

In still another exemplary embodiment of the invention, a method of aligning an inner shell and an outer shell of a turbine casing includes the steps of extending a substantially flat plate across both the inner shell and the outer shell of the turbine casing; positioning the substantially flat plate over the connecting bolts on the outer shell via a pair of openings through the flat plate; positioning the substantially flat plate to receive threaded bolts via a plurality of apertures through the flat plate and into existing openings in the inner shell; and adjusting at least one of the inner shell and the outer shell relative to the other in multiple degrees of freedom to control both co-linearity and concentricity of the outer shell and the inner shell with a pair of planar adjusting mechanisms respectively engageable with the connecting bolts via the pair of openings.

DETAILED DESCRIPTION OF THE INVENTION

Figure 1:
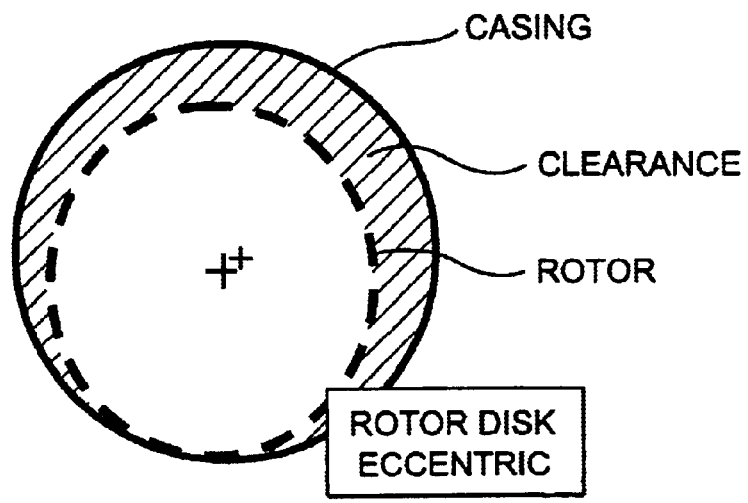
FIG. 1 illustrates an eccentric stator and rotor showing varying clearance around the circumference.
Figure 2:
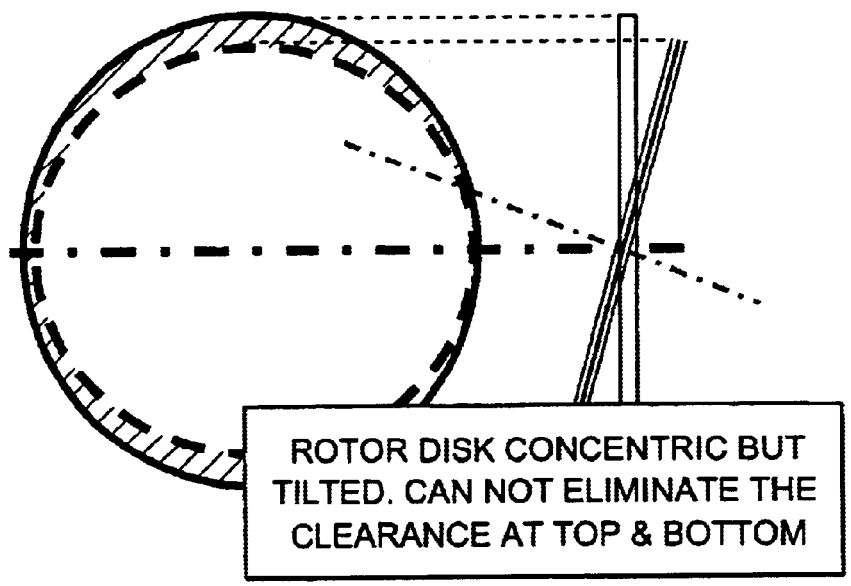
FIG. 2 illustrates an out-of-plane misalignment causing elliptical clearance.
Figure 3:
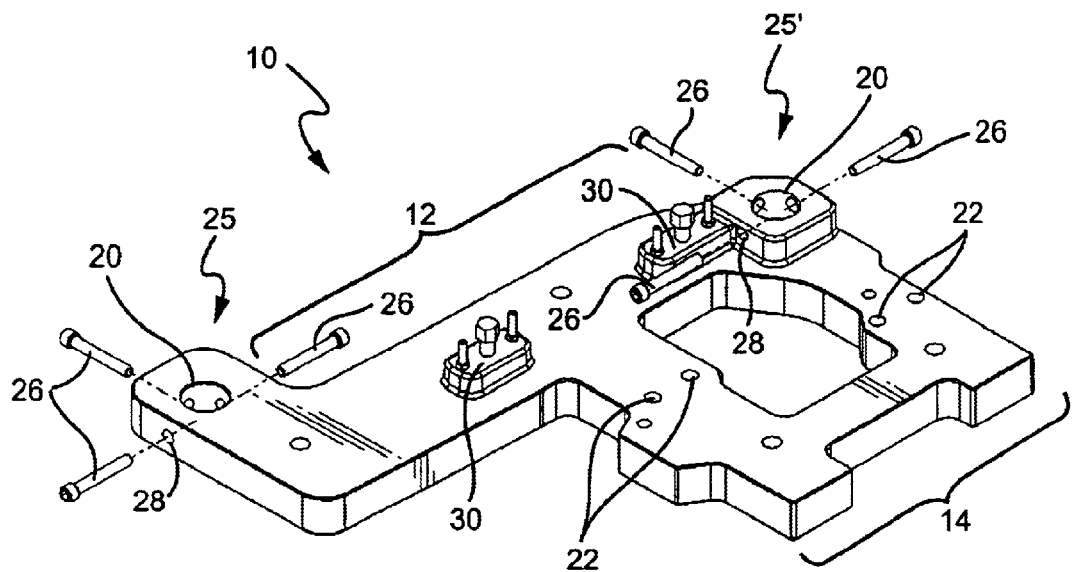
FIG. 3 is a perspective view of an alignment tool.
Figure 4:
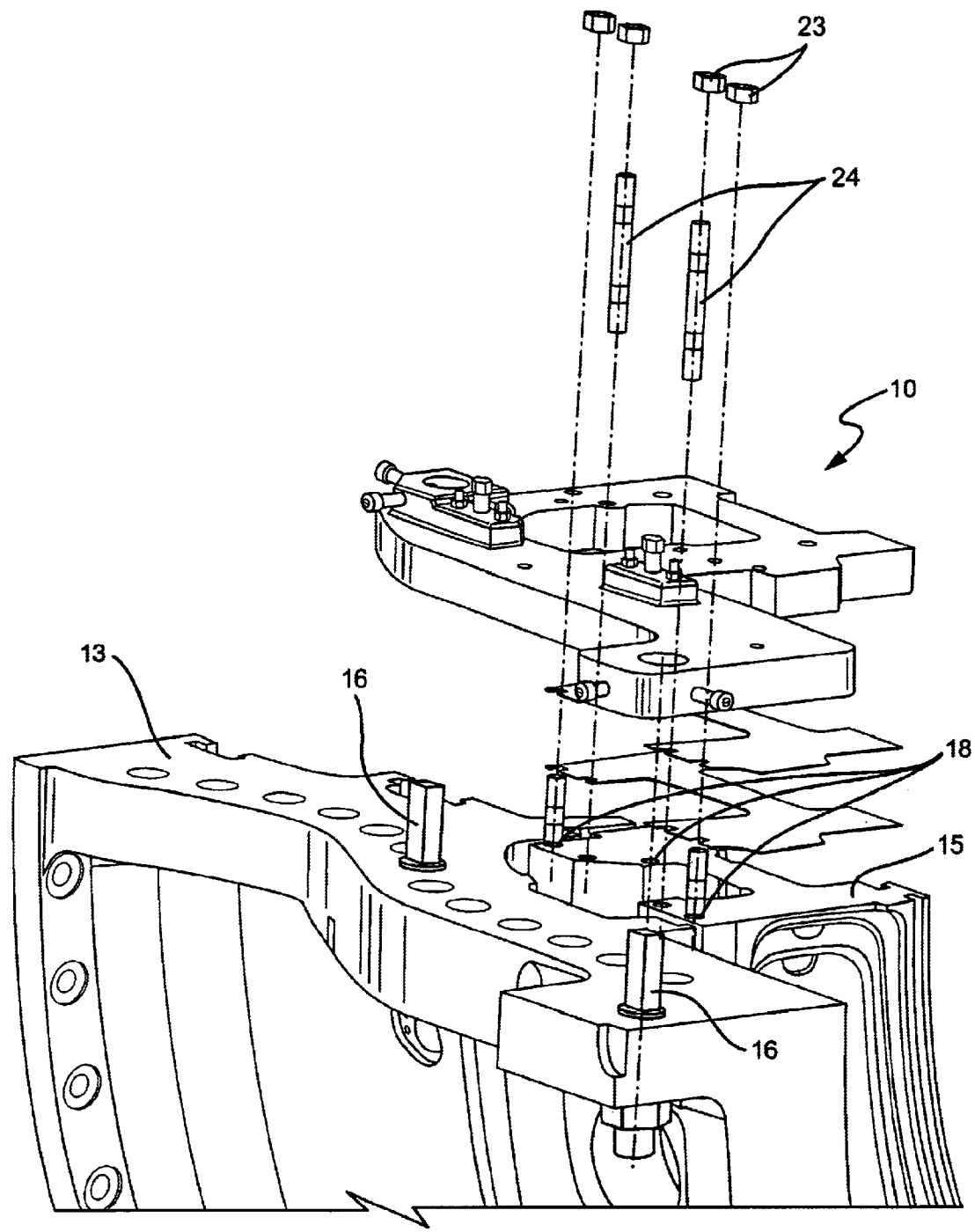
FIG. 4 is an assembly drawing illustrating the manner of securing the alignment tool to existing turbine casing components.

With reference to FIGS. 3 and 4, a turbine casing alignment tool 10 includes a first section 12 securable to an outer shell 13 of a turbine casing. A second section 14 of the tool 10 is securable to an inner shell 15 of the turbine casing. The turbine casing alignment tool 10 is generally formed of a flat plate of steel that is particularly shaped to extend across both the inner shell 15 and the outer shell 13 of the turbine casing. The flat plate is preferably machined from plate stock. Pads may be added for strength and stability. As described in more detail below, the alignment tool 10 facilitates adjustment of at least one of the inner shell 15 and the outer shell 13 relative to the other in multiple degrees of freedom to control both co-linearity and concentricity of the outer shell 13 and the inner shell 15.

As is conventional, a turbine casing can be formed in two halves, wherein a top half is secured to a bottom half via at least a pair of connecting bolts 16. The turbine casing inner shell 15 conventionally includes a plurality of openings 18 therein for a similar purpose. Beyond the existence of the connecting bolts 16 and openings 18, the details of the turbine casing do not form part of the invention and will thus not be further described. Those of ordinary skill in the art will appreciate conventional constructions of known turbine casings.

The first section 12 of the alignment tool 10 includes a pair of openings 20 that are sized and positioned to receive the connecting bolts 16 on the outer shell 13. The second section 14 includes a plurality of apertures 22 that are correspondingly sized and positioned to receive threaded bolts 24 therein and through the existing openings 18 in the inner shell 15. The threaded bolts 24 are preferably secured by nuts 23.

A pair of planar adjusting mechanisms 25 are respectively engageable with the connecting bolts 16 via the pair of openings 20. Each planar adjusting mechanism 25 includes at least one adjusting screw 26 respectively disposed in screw holes 28 extending into the openings 20 along axes parallel to a plane of the alignment tool 10 and perpendicular to axes of the openings 20. If necessary or desirable, the planar adjusting mechanisms 25 may be slightly modified in order to ensure the desired multiple degrees of freedom in the alignment operation. As shown in FIG. 3, the planar adjusting mechanism 25 is formed on an eccentric portion of the first section 12 to facilitate the use of three adjusting screws 26. Alternatively or additionally, the modified planar adjusting mechanism 25' may include a stepped portion as shown for the same purpose. In use, by adjusting a position of the adjusting screws 26, the outer shell 13 can be shifted relative to the inner shell 15 for in-plane alignment.

Figure 5:
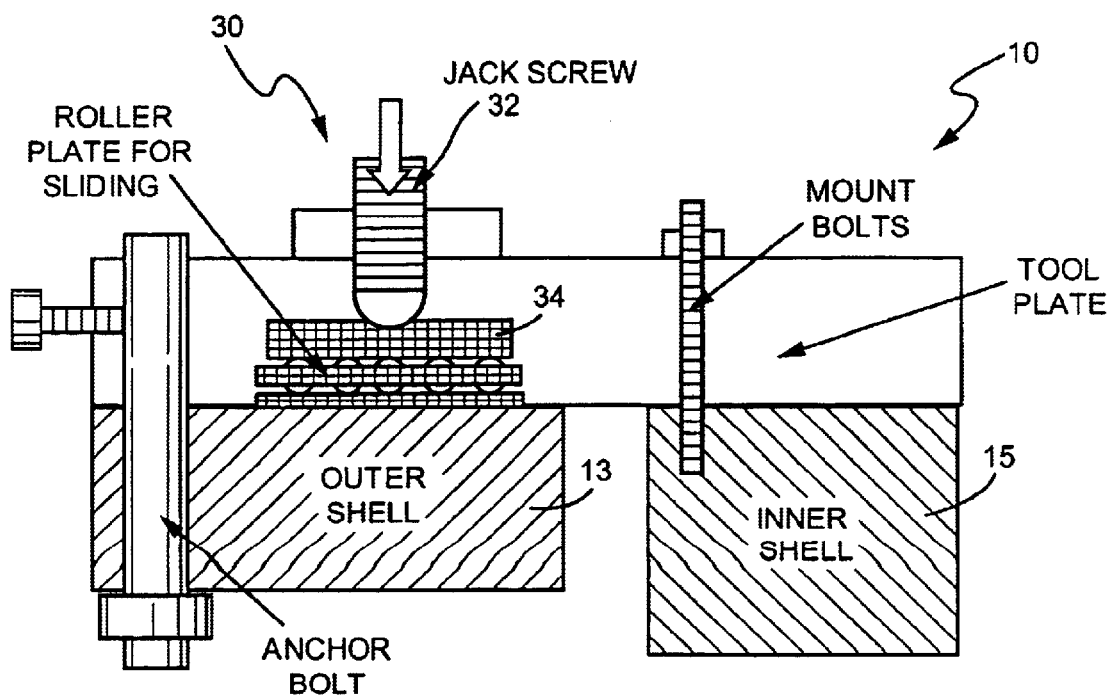
FIG. 5 is a schematic illustration of the jacking mechanism.

The first section 12 also includes at least one, preferably two, jacking bolt and ball plate assembly 30. The jacking bolt and ball plate assembly 30 effects vertical alignment of the outer shell 13 relative to the inner shell 15 of the turbine casing. With reference to FIG. 5, the jacking bolts 32 are designed to lift the weight of the inner shell 15 with minimal torque while allowing the inner shell 15 to slide in plane by introduction of friction-less roller plates 34 between the bolts 32 and the outer shell 13 face.

A known alignment diagram or template is used to define the relative positions of the outer and inner shell 13, 15 of the turbine casing. After an adjustment using the turbine casing alignment tool 10 of the invention, a measurement can be made using the alignment template, and further adjustments can be made if necessary.

With the structure of the turbine casing alignment tool, the overall cost of turbine manufacture can be reduced while reducing down time and costs for repairs. Additionally, the alignment tool provides added motion control during alignment. Moreover, since alignment is performed only on half of the inner turbine shell, the process requires moving only half the weight. Still further, half-shell alignment requires half the parts to be ready at the site, considerably reducing logistics and operating space requirements.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A turbine casing alignment tool comprising:
   a first section securable to an outer shell of a turbine casing; and
   a second section securable to an inner shell of the turbine casing, wherein the first and second sections define structure that facilitates adjustment of at least one of the inner shell and the outer shell relative to the other in multiple degrees of freedom to control both co-linearity and concentricity of the outer shell and the inner shell.

2. A turbine casing alignment tool according to claim 1, wherein a top half of the turbine casing is secured to a bottom half of the turbine casing via at least a pair of connecting bolts, and wherein the first section comprises a pair of openings sized and positioned to receive the connecting bolts on the outer shell.

3. A turbine casing alignment tool according to claim 2, wherein the second section comprises a plurality of apertures sized and positioned to receive threaded bolts therein and into existing openings in the inner shell.

4. A turbine casing alignment tool according to claim 1, wherein the tool is formed of steel.

5. A turbine casing alignment tool comprising:
   a first section securable to an outer shell of a turbine casing;
   a second section securable to an inner shell of the turbine casing, wherein the alignment tool facilitates adjustment of at least one of the inner shell and the outer shell relative to the other in multiple degrees of freedom to control both co-linearity and concentricity of the outer shell and the inner shell, wherein a top half of the turbine casing is secured to a bottom half of the turbine casing via at least a pair of connecting bolts, and wherein the first section comprises a pair of openings sized and positioned to receive the connecting bolts on the outer shell; and
   at least first and second adjusting screws respectively disposed in screw holes extending into said openings along axes parallel to a plane of the alignment tool and perpendicular to axes of said openings, the first and second adjusting screws effecting in-plane alignment.

6. A turbine casing alignment tool according to claim 5, wherein the first section further comprises at least one jacking bolt and ball plate assembly, the jacking bolt and ball plate assembly effecting vertical alignment.

7. A turbine casing alignment tool for aligning an inner shell and an outer shell of a turbine casing, the turbine casing including a top half and a bottom half connected via at least a pair of connecting bolts, the alignment tool comprising:
   a substantially flat plate extendible across both the inner shell and the outer shell of the turbine casing;
   a pair of openings through the flat plate sized and positioned to receive the connecting bolts on the outer shell;
   a plurality of apertures through the flat plate sized and positioned to receive threaded bolts therein and into existing openings in the inner shell; and
   a pair of planar adjusting mechanisms respectively engageable with the connecting bolts via the pair of openings,
   wherein the planar adjusting mechanisms each comprises at least one adjusting screw disposed in a screw hole extending into a respective one of said openings along axes parallel to a plane of the alignment tool and perpendicular to axes of said openings, the at least one adjusting screw effecting in-plane alignment.

8. A turbine casing alignment tool according to claim 7, further comprising at least one jacking bolt and ball plate assembly, the jacking bolt and ball plate assembly effecting vertical alignment.

9. A turbine casing alignment tool according to claim 7, wherein the planar adjusting mechanisms each comprises three adjusting screws disposed in respective screw holes extending into a respective one of said openings.

10. A method of aligning an inner shell and an outer shell of a turbine casing, the turbine casing including a top half and a bottom half connected via at least a pair of connecting bolts, the method comprising:
    extending a substantially flat plate across both the inner shell and the outer shell of the turbine casing;
    positioning the substantially flat plate over the connecting bolts on the outer shell via a pair of openings through the flat plate;
    positioning the substantially flat plate to receive threaded bolts via a plurality of apertures through the flat plate and into existing openings in the inner shell; and
    adjusting at least one of the inner shell and the outer shell relative to the other in multiple degrees of freedom to control both co-linearity and concentricity of the outer shell and the inner shell with a pair of planar adjusting mechanisms respectively engageable with the connecting bolts via the pair of openings.

* * * * *